United States Patent
Qi et al.

(10) Patent No.: US 11,500,341 B2
(45) Date of Patent: Nov. 15, 2022

(54) SOURCE-LOAD COOPERATION ACCESS METHOD FOR A POWER DISTRIBUTION REGION, TERMINAL AND STORAGE MEDIUM

(71) Applicants: ELECTRIC POWER SCIENCE & RESEARCH INSTITUTE OF STATE GRID TIANJIN ELECTRIC POWER COMPANY, Hebei District Tianjin (CN); STATE GRID TIANJIN ELECTRIC POWER COMPANY, Hebei District Tianjin (CN); STATE GRID CORPORATION OF CHINA, Xicheng District Beijing (CN); TIANJIN UNIVERSITY, Nankai District Tianjin (CN)

(72) Inventors: Yan Qi, Tianjin (CN); Xudong Wang, Tianjin (CN); Yunfei Mu, Tianjin (CN); Xuejun Shang, Tianjin (CN); Bofeng Luo, Tianjin (CN); Yi Ding, Tianjin (CN); Xianxu Huo, Tianjin (CN); Zhijun Zhang, Tianjin (CN); Lei Wu, Tianjin (CN)

(73) Assignees: ELECTRIC POWER SCIENCE & RESEARCH INSTITUTE OF STATE GRID TIANJIN ELECTRIC POWER COMPANY, Tianjin (CN); STATE GRID TIANJIN ELECTRIC POWER COMPANY, Tianjin (CN); STATE GRID CORPORATION OF CHINA, Beijing (CN); TIANJIN UNIVERSITY, Tianjin (CN)

( * ) Notice: Subject to any disclaimer, the term of this patent is extended or adjusted under 35 U.S.C. 154(b) by 262 days.

(21) Appl. No.: 16/759,456
(22) PCT Filed: Dec. 17, 2019
(86) PCT No.: PCT/CN2019/125811
§ 371 (c)(1),
(2) Date: Apr. 27, 2020

(87) PCT Pub. No.: WO2020/140743
PCT Pub. Date: Jul. 9, 2020

(65) Prior Publication Data
US 2021/0208548 A1    Jul. 8, 2021

(30) Foreign Application Priority Data
Dec. 30, 2018    (CN) .......................... 201811648669.6

(51) Int. Cl.
  *G05B 13/04*    (2006.01)
  *G06Q 10/04*    (2012.01)
  (Continued)

(52) U.S. Cl.
  CPC .......... *G05B 13/047* (2013.01); *G06Q 10/04* (2013.01); *G06Q 50/06* (2013.01); *H02S 10/12* (2014.12)

(58) Field of Classification Search
  CPC ...... G05B 13/047; G06Q 10/04; G06Q 50/06; H02S 10/12; Y02E 10/50; Y02E 40/70; Y04S 10/50
  See application file for complete search history.

(56) References Cited

FOREIGN PATENT DOCUMENTS

| CN | 106230026 A | 12/2016 |
| CN | 107147152 A | 9/2017 |

(Continued)

OTHER PUBLICATIONS

CN107688879A Search Translation. (Year: 2017).*
(Continued)

*Primary Examiner* — Tejal Gami
(74) *Attorney, Agent, or Firm* — ArentFox Schiff LLP

(57) ABSTRACT

Provided is a source-load cooperation access method for a power distribution region. The method includes: establish-
(Continued)

ing a timing feature model of a distributed generator and a timing feature model of a load respectively, acquiring a timing feature of the distributed generator in an access power distribution region by using maximum likelihood estimation and acquiring a timing feature of a user which accesses the power distribution region by using classification and regression trees; and inputting the timing feature of the distributed generator and the timing feature of the user which access the power distribution region into a combination optimization model, and determining a source-load access feeder through optimization.

17 Claims, 5 Drawing Sheets

(51) Int. Cl.
  *G06Q 50/06* (2012.01)
  *H02S 10/12* (2014.01)

(56) References Cited

FOREIGN PATENT DOCUMENTS

| CN | 107688879 A | 2/2018 |
| CN | 107800140 A | 3/2018 |
| CN | 108288231 A | 7/2018 |
| CN | 110009123 A | 7/2019 |

OTHER PUBLICATIONS

International Search Report for PCT/CN2019/125811 dated Mar. 4, 2020 in Chinese Translation.
Office Action issued in connection with Chinese Patent Application No. 201811648669.6 dated Jan. 13, 2022.
Qi et al., Coordinated Access Method for Source-load in Distribution Area with the Consideration of Complementary Sequential Features, Dec. 19, 2018, China Academic Journal Electronic Publishing House.
Ning, Based on the Hybrid Intelligent Optimization Algorithm of Vehicle Routing Optimization Research, Jun. 30, 2018.

\* cited by examiner

SOURCE-LOAD COOPERATION ACCESS METHOD FOR A POWER DISTRIBUTION REGION, TERMINAL AND STORAGE MEDIUM

CROSS-REFERENCE TO RELATED APPLICATION

The present application a national stage application under 35 U.S.C. 371 based on international patent application PCT/CN2019/125811, filed on Dec. 17, 2019, which claims priority to Chinese patent application No. 201811648669.6 filed on Dec. 30, 2018, disclosures of which are incorporated herein by reference in their entireties.

TECHNICAL FIELD

The present application belongs to the field of access technologies of a load power supply system containing electric energy substitution, for example, relates to a source-load cooperation access method for a power distribution region, a terminal and a storage medium.

BACKGROUND

With the continuous development of national economy, load characteristics of a power distribution region (hereinafter referred to as a region) are undergoing profound changes. At a load end, loads belonging to the region demonstrate complex forms of diversity, complementarity and correlation, a peak-to-valley difference of a transformer in the region (hereinafter referred to as a region transformer) continuously increases, a contradiction between supply and demand during a peak electricity usage period is increasingly prominent, and it is difficult to perform peak load regulations for a power grid. At a source end, distributed generators (DGs) represented by photovoltaic and wind power access the power distribution region in large quantities. However, the access of the DGs in large quantities imposes a higher requirement for safe operation of the power distribution region, changes comprehensive load characteristics showed by "source-load" combinations in the region, and even leads to problems such as an increased peak-to-valley difference and a reverse power transmission.

A large number of researches have been conducted on the region with the access of both the DG and the load (hereinafter referred to as a source-load), and different control strategies have been proposed, which mainly focus on orderly guiding cooperative and optimized operation of a controllable load and the distributed generator through a reasonable control measure and an electricity price guidance mechanism. In some documents, a probability model for residential electricity consumption is established, and based on a load state probability matrix, an active load-demand response scheme aiming at maximizing distributed photovoltaic consumption is made. An interactive charging control strategy for electric vehicles proposed in some documents can make the electric vehicles match photovoltaic output to promote photovoltaic consumption. In some documents, a cooperative scheduling model of the controllable load, the DG and an energy storage device is proposed to support full consumption of renewable energy resources. In some documents, a weighted coefficient queuing algorithm based on an improved colored power algorithm is proposed, which may be used for directly controlling common temperature control loads such as air conditioners and heat pumps in a home environment to participate in a demand side response, promoting optimized utilization of the distributed generator. In some documents, a cooperative potential of an electric heating load in wind power consumption is embodied through optimized scheduling of the electric heating load. In some documents, a cooperative and optimized scheduling model for the source-load which relates to the control of an air conditioner load group is established, which reduces power generation costs and load control costs. However, existing documents mostly focus on a source-load cooperation control in the region.

Planners still use relatively extensive procedures or standards for source-load access to the region, and it is easy to cause long-term high-load operation of some regions and long-term light-load operation of some regions. Therefore, for the source-load cooperation access, how to improve a power supply capacity of a feeder while ensuring the full consumption of new energy resources is an urgent problem to be solved.

SUMMARY

The present application provides a source-load cooperation access method for a power distribution region, a terminal and a storage medium, which can reduce a construction cost of the region, improve a utilization rate of a feeder in the region, and meanwhile fully improve a capability of the region to consume clean energy resources.

A source-load cooperation access method for a power distribution region provided by the present application includes steps described below.

A timing feature model of a distributed generator and a timing feature model of a load are established respectively, a timing feature of the distributed generator which accesses the power distribution region is acquired by using maximum likelihood estimation and the timing feature model of the distributed generator, and a timing feature of the load which accesses the power distribution region is acquired by using classification and regression trees and the timing feature model of the load.

The timing feature of the distributed generator which accesses the power distribution region and the timing feature of the load which accesses the power distribution region are inputted into a combination optimization model, and a source-load access feeder is determined through optimization.

In an embodiment, the step of establishing the timing feature model of the distributed generator includes steps described below. A timing feature model for photovoltaic generation is established as follows:

$$P_s = EDη,$$

where $P_s$ denotes output power of the photovoltaic generation, $E$ denotes a lighting intensity, $D$ denotes an area of a photovoltaic panel and $η$ denotes light energy conversion efficiency.

A timing feature model of a fan is established as follows:

$$P_w = \begin{cases} 0 & 0 \leq V_{ci} \\ (A + Bv + Cv^2)P_r & V_{ci} \leq v < V_r \\ P_r & V_r \leq v < V_{co} \\ 0 & V_{co} \leq v \end{cases},$$

$$A = \frac{V_{ci}(V_{ci} + V_r) - 4V_{ci}V_r\left(\frac{V_{ci} + V_r}{2V_r}\right)^3}{V_{ci} + V_r},$$

-continued $$B = \frac{-(V_{ci} + V_r) - 4V_{ci}V_r\left(\frac{V_{ci} + V_r}{2V_r}\right)^3}{V_{ci} + V_r}, \text{ and}$$

$$C = \frac{2 - 4\left(\frac{V_{ci} + V_r}{2V_r}\right)^3}{V_{ci} + V_r};$$

where $P_w$ denotes output power of the fan, v denotes a wind speed of a nature wind, $V_r$ denotes a rated wind speed of the fan, $V_{ci}$ denotes a cut-in wind speed of the fan, $V_{co}$ denotes a cut-out wind speed of the fan, $P_r$ denotes rated output power of the fan, and A, B and C denote fitting coefficients of a nonlinear part of an output of the fan respectively. In the present application, v is 14 m/s, $V_{ci}$ is 4 m/s, and $V_{co}$ is 25 m/s.

(2) The step of acquiring, by using the maximum likelihood estimation and the timing feature model of the distributed generator, the timing feature of the distributed generator which accesses the power distribution region includes steps described below. In a case where the lighting intensity follows a Beta distribution, shape parameters $\lambda$ and $\mu$ of the Beta distribution of the lighting intensity are solved by a maximum likelihood method and according to historical data of the lighting intensity measured in the access power distribution region. The lighting intensity satisfying the Beta distribution is simulated based on the shape parameters $\lambda$ and $\mu$ of the Beta distribution of the lighting intensity and by a Monte Carlo method, and a timing feature of a photovoltaic unit in the access power distribution region is calculated according to the timing feature model for the photovoltaic generation and the simulated lighting intensity. In a case where the wind speed of the nature wind follows a Weibull distribution, a shape parameter s and a scale parameter l of the Weibull distribution of the wind speed of the nature wind are solved by the maximum likelihood method and according to historical data of the wind speed of the nature wind measured in the access power distribution region. The wind speed of the nature wind satisfying the Weibull distribution is simulated based on the shape parameter s and the scale parameter l of the Weibull distribution of the wind speed of the nature wind and by the Monte Carlo method, and a timing feature of the fan in the access power distribution region is calculated according to the timing feature model of the fan and the simulated wind speed of the nature wind.

The step of establishing the timing feature model of the load includes a step described below. A plurality of pieces of historical load data collected by a load control system is classified by a fuzzy C-means (FCM) clustering algorithm to obtain a plurality of classes of load data, and a class center of each of the plurality of classes of load data is extracted as a timing feature of the each of the plurality of classes of load data.

The step of acquiring, by using the classification and regression trees and the timing feature model of the load, the timing feature of the load accesses power distribution region includes steps described below. A classifier is constructed through the classification and regression trees (CART), a current node of the classifier is supposed to be t, a sample dataset of the current node is S, and the sample dataset is composed of M samples, and it is determined that the M samples belong to L timing features through the timing feature model of the load. In a case where a number of samples belonging to a k-th class center $X_k$ in t is $s_k$, a Gini index (GINI) characterizing an impurity degree of the current node is expressed as:

$$GINI(t) = 1 - \sum_{k=1}^{L}(p(X_k \mid t))^2,$$

where $p(X_k|t)=s_k/M$ denotes a proportion of the samples belonging to $x_k$ in S.

t is split by using a load characteristic index to generate two subnodes $t_R$ and $t_L$, where GINI of the subnodes are GINI($t_R$) and GINI($t_L$), and a reduction amount of the impurity degree in the splitting is: $\Phi(t)=GINI(t)-p_RGINI(t_R)-p_LGINI(t_L)$; where $p_LGINI(t_L)$ denotes a probability of assigning samples in t to $t_L$, $p_RGINI(t_R)$ denotes a probability of assigning samples in t to $t_R$, and a load characteristic index with a maximum impurity reduction amount is selected as a classification attribute. The preceding process is repeated and the classification attribute is continuously selected until a minimum GINI is satisfied, to obtain a final classifier, and according to an installation requisition parameter of a new access load and the classifier, a load timing feature of the access power distribution region is identified. In an embodiment, the step of solving the shape parameters $\lambda$ and $\mu$ of the Beta distribution of the lighting intensity by the maximum likelihood method and according to the historical data of the lighting intensity measured in the access power distribution region includes constructing a logarithm likelihood function $L(\lambda,\mu)$:

$$L(\lambda,\mu)=\sum_{i=1}^{n} \ln f(E_i),$$

where $E_i$ denotes a lighting intensity at a moment i.
Let:

$$F_1 = \frac{\partial L(\lambda, \mu)}{\partial \lambda} = 0, \text{ and}$$

$$F_2 = \frac{\partial L(\lambda, \mu)}{\partial \mu} = 0,$$

$F_1$ and $F_2$ are iteratively solved by a Newton-Raphson method to obtain a correction equation:

$$\begin{bmatrix} F_1(\lambda, \mu) \\ F_2(\lambda, \mu) \end{bmatrix} = \begin{bmatrix} \frac{\partial F_1(\lambda, \mu)}{\partial \lambda} & \frac{\partial F_1(\lambda, \mu)}{\partial \mu} \\ \frac{\partial F_2(\lambda, \mu)}{\partial \lambda} & \frac{\partial F_2(\lambda, \mu)}{\partial \mu} \end{bmatrix} \begin{bmatrix} \Delta\lambda \\ \Delta\mu \end{bmatrix} = 0.$$

An initial value is selected according to the correction equation, and iterations are performed until a convergence criterion is satisfied to obtain the shape parameters $\lambda$ and $\mu$ of the Beta distribution.

The step of solving the shape parameter s and the scale parameter l of the Weibull distribution of the wind speed of the nature wind by the maximum likelihood method and according to the historical data of the wind speed of the nature wind measured in the access power distribution region includes steps described below.

$$L(\lambda,\mu)=\sum_{i=1}^{n} \ln f(E_i),$$

where $v_i$ denotes a wind speed of the nature wind at the moment i.
Let:

$$F_3 = \frac{\partial L(s, l)}{\partial s} = 0, \text{ and}$$

-continued $$F_4 = \frac{\partial L(s, l)}{\partial l} = 0,$$

$F_3$ and $F_4$ are iteratively solved by the Newton-Raphson method to obtain a correction equation:

$$\begin{bmatrix} F_3(s, l) \\ F_4(s, l) \end{bmatrix} = \begin{bmatrix} \frac{\partial F_3(s, l)}{\partial s} & \frac{\partial F_4(s, l)}{\partial l} \\ \frac{\partial F_2(\lambda, \mu)}{\partial s} & \frac{\partial F_4(s, l)}{\partial l} \end{bmatrix} \begin{bmatrix} \Delta s \\ \Delta l \end{bmatrix} = 0.$$

An initial value is selected according to the correction equation, and iterations are performed until a convergence criterion is satisfied to obtain the shape parameter s and the scale parameter l of the Weibull distribution.

In an embodiment, the step of simulating the lighting intensity satisfying the Beta distribution based on the shape parameters $\lambda$ and $\mu$ of the Beta distribution of the lighting intensity and by the Monte Carlo method includes steps described below.

A probability distribution function F(E) of the lighting intensity E is acquired based on the shape parameters $\lambda$ and $\mu$ of the Beta distribution of the lighting intensity, and the lighting intensity satisfying the Beta distribution is simulated according to the probability distribution function F(E) of the lighting intensity E and by the Monte Carlo method.

$$F(E) = \frac{\Gamma(\lambda + \mu)}{\Gamma(\lambda)\Gamma(\mu)} \int_0^{E/E_m} t^{\lambda-1}(1-t)^{\mu-1} dt,$$

where $\Gamma(.)$ denotes a gamma function, $E_m$ denotes a maximum value of the lighting intensity, and $\lambda$ and $\mu$ denote the shape parameters of the Beta distribution.

The step of simulating the wind speed of the nature wind satisfying the Weibull distribution based on the shape parameter s and the scale parameter l of the Weibull distribution of the wind speed of the nature wind and by the Monte Carlo method includes steps described below.

A probability distribution function F(v) of the wind speed v of the nature wind is acquired based on the shape parameter s and the scale parameter l of the Weibull distribution of the wind speed of the nature wind, and the wind speed of the nature wind satisfying the Weibull distribution is simulated according to the probability distribution function F(v) of the wind speed v of the nature wind and by the Monte Carlo method.

The probability distribution function F(v) of the wind speed v of the nature wind is:

$$F(v) = 1 - \exp\left(-\frac{v}{l}\right)^s;$$

where s is the shape parameter of the Weibull distribution, and l is the scale parameter of the Weibull distribution.

In an embodiment, the step of classifying the plurality of pieces of historical load data collected by the load control system by using the fuzzy C-means (FCM) clustering algorithm to obtain the plurality of classes of load data includes steps described below.

For the plurality of pieces of historical load data, the plurality of pieces of historical load data is classified into L classes by using the FCM algorithm, where an i-th piece of historical load data is normalized as $D_i$ and expressed as:

$$D_i = [d_{i,1}, d_{i,2}, \ldots, d_{i,j}, \ldots, d_{i,m}],$$

where $d_{i,j}$ denotes active power of the load within a j-th period in the i-th piece of historical load data, and m denotes a number of sampling periods in one day, and i is an integer greater than 0.

A class center matrix X is expressed as:

$$X = [X_1, X_2, \ldots, X_k, \ldots, X_L]^T.$$

A degree of membership $V_{i,k}$ of to the k-th class center $X_k$ satisfies a following condition:

$$\sum_{k=1}^{L} V_{i,k} = 1 \forall i = 1, 2, \ldots, N,$$

where N denotes a number of samples of the historical load data.

An objective function of the FCM is:

$$\min F = \sum_{i=1}^{N} \sum_{k=1}^{L} V_{i,k}^2 \|D_i - X_k\|.$$

The above formula is solved through a lagrange transformation to obtain:

$$V_{i,k} = \|D_i = X_k\| \bigg/ \sum_{k=1}^{L} \|D_i - X_k\|, \text{ and}$$

$$X_k = \sum_{i=1}^{N} (V_{i,k}^2 D_i) \bigg/ \sum_{i=1}^{N} V_{i,k}^2.$$

In the FCM, the class center matrix X and a degree-of-membership matrix V are updated through iterations, the objective function F of the FCM is calculated until F no longer changes, and an attribution timing feature of the plurality of pieces of historical load data is determined according to a maximum degree-of-membership principle; where in a case where $D_i$ belongs to $X_k$, $V_{i,k}$ satisfies:

$$V_{i,k} = \max\{V_{i,1}, V_{i,2}, \ldots, V_{i,k}, \ldots, V_{i,L}\},$$

where $\max\{.\}$ denotes a maximum value function.

In an embodiment, a timing feature of a new access load i is $A_i$, where $A_i$ is expressed as:

$$A_i = [A_{i,1}, A_{i,2}, \ldots, A_{i,k}, \ldots, A_{i,24}].$$

The combination optimization model is used for determining a feeder which a certain load accesses in a case where n feeders are available for access in the access power distribution region, and a decision variable of the combination optimization model is capable of being expressed by variables 0 and 1:

$$D_{i,k} = \begin{cases} 1, & \text{A load } i \text{ accesses a feeder } k \\ 0, & \text{Other} \end{cases}.$$

A load of a k-th feeder before the load accesses is $L_k$, and after a new load accesses, a load $L_k$ of the feeder is updated as:

$$L_k = I_k + \sum_{i=1}^{n} D_{i,k} \cdot A_i.$$

The combination optimization model targets a maximum power supply capability of the feeder, and an objective function of the combination optimization model is:

$$\max G = \sum_{k=1}^{n} (P_{k,N} - P_{k,max}),$$

where n denotes a number of optional feeders, $P_{k,N}$ denotes an upper limit of an active transmission capacity of the k-th feeder, and $P_{k,max}$ denotes a maximum load of the k-th feeder.

Each feeder in the access power distribution region satisfies a following constraint condition: $P_{k,max} \leq P_{k,N}$.

An embodiment of the present application further provides a computer-readable storage medium which is configured to store computer programs, where when executed by a processor, the computer programs implement the method according to any one of the embodiments of the present application.

An embodiment of the present application further provides a terminal including a processor and a memory for storing programs, where when executed by the processor, the programs implement the method according to any one of the embodiments of the present application.

DETAILED DESCRIPTION

Embodiments of the present application are further described below in conjunction with the drawings.

Figure 1:
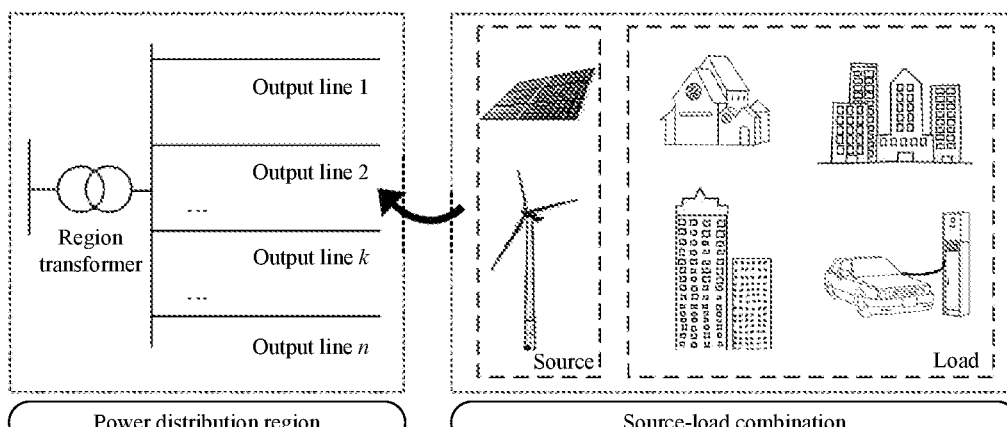
FIG. 1 is a flowchart of a source-load cooperation access method for a power distribution region according to an embodiment of the present application.

FIG. 1 is a flowchart of a source-load cooperation access method for a power distribution region according to an embodiment of the present invention. Referring to FIG. 1, the method provided by the embodiment of the present application includes steps described below.

In step 110, a timing feature model of a distributed generator and a timing feature model of a load are established respectively, a timing feature of the distributed generator which accesses the power distribution region is acquired by using maximum likelihood estimation and the timing feature model of the distributed generator, and a timing feature of the load which accesses the power distribution region is acquired by using classification and regression trees and the timing feature model of the load.

In step 120, the timing feature of the distributed generator which accesses the power distribution region and the timing feature of the load which accesses the power distribution region are inputted into a combination optimization model, and a source-load access feeder is determined through optimization.

The present application provides a source-load cooperation access method for the power distribution region. A timing feature of the distributed generator and a timing feature of the load are analyzed, and the timing feature of the distributed generator and a timing feature of a user which accesses the power distribution region are acquired by using the maximum likelihood estimation and the classification and regression trees respectively. The optimization model for a source-load combination which accesses the power distribution region is proposed, which targets a maximum power supply capability of a feeder in the power distribution region, uses the source-load combination which accesses the power distribution region as a decision variable, and provides a power supply access strategy. Effectiveness of the proposed method is verified by an example. A result of the example indicates that the source-load cooperation access method based on the timing features for the power distribution region provided by the present application can reduce a construction cost of the power distribution region, improve a utilization rate of the feeder in the power distribution region, and meanwhile fully improve a capability of the power distribution region to consume clean energy resources through an optimized source-load combination which accesses the power distribution region.

Figure 2:
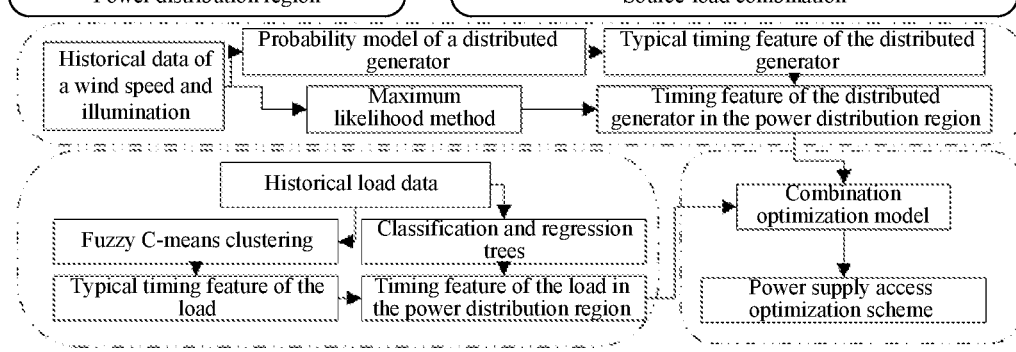
FIG. 2 is a schematic diagram of source-load cooperation in a power distribution region according to an embodiment of the present application.
Figure 3A:
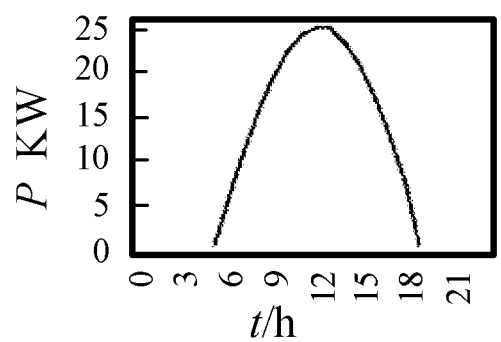
FIG. 3A is a schematic diagram of a timing feature of photovoltaic generation according to an embodiment of the present application.
Figure 3B:
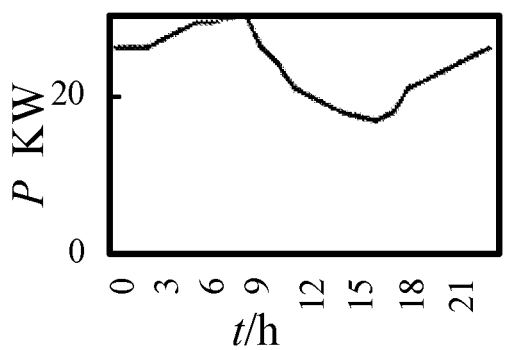
FIG. 3B is a schematic diagram of a timing feature of wind power generation according to an embodiment of the present application.
Figure 3C:
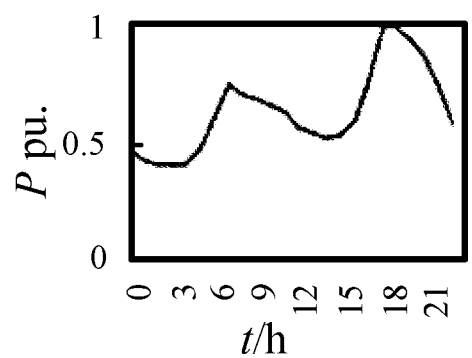
FIG. 3C is a schematic diagram of load timing feature 1 according to an embodiment of the present application.
Figure 3D:
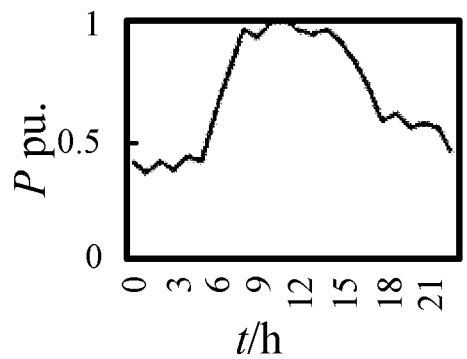
FIG. 3D is a schematic diagram of load timing feature 2 according to an embodiment of the present application.
Figure 3E:
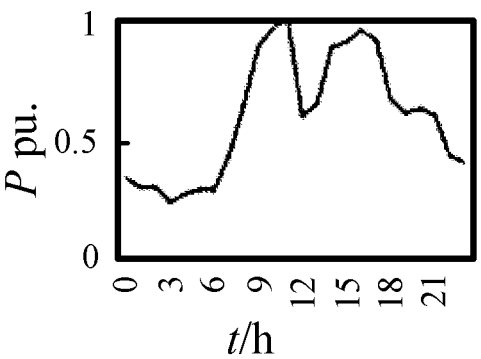
FIG. 3E is a schematic diagram of load timing feature 3 according to an embodiment of the present application.
Figure 3F:
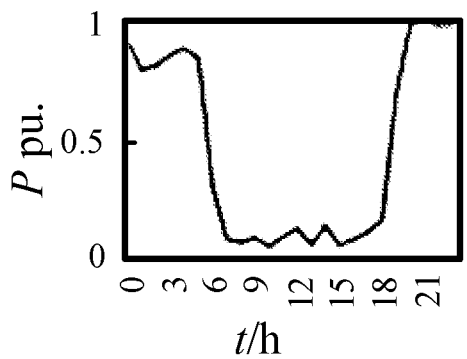
FIG. 3F is a schematic diagram of load timing feature 4 according to an embodiment of the present application.
Figure 3G:
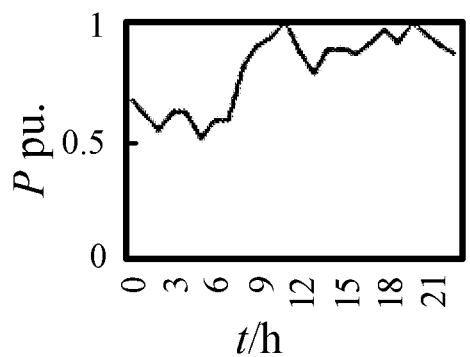
FIG. 3G is a schematic diagram of load timing feature 5 according to an embodiment of the present application.
Figure 3H:
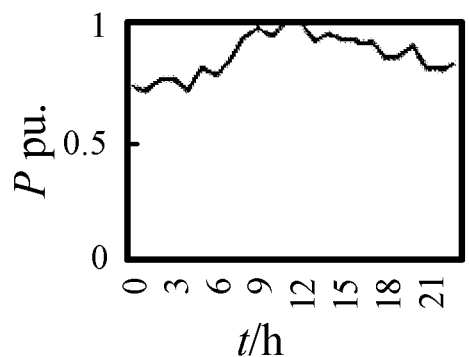
FIG. 3H is a schematic diagram of load timing feature 6 according to an embodiment of the present application.

The source-load cooperation access method for the power distribution region provided by the present application, as shown in FIG. 2, includes steps described below.

In step 10, the timing feature of the distributed generator and the timing feature of the load are analyzed, the timing feature model of the distributed generator and the timing feature model of the load are established respectively, and the timing feature of the distributed generator which accesses the power distribution region and the timing feature of the user which accesses the power distribution region are acquired by using the maximum likelihood estimation and the classification and regression trees respectively.

Step 10 includes steps described below.

(1) The timing feature of the distributed generator is analyzed.

Output power $P_s$ for photovoltaic generation is expressed by formula (1):

$$P_s = ED\eta \tag{1}$$

In the above formula, E denotes a lighting intensity of the region, D denotes an area of a photovoltaic panel, and $\eta$ denotes light energy conversion efficiency.

The lighting intensity E approximately follows to a Beta distribution, and a probability density function $f(E)$ and a probability distribution function $F(E)$ of the lighting intensity E are respectively expressed by formulas (2) and (3):

$$f(E) = \frac{\Gamma(\lambda+\mu)}{\Gamma(\lambda)\Gamma(\mu)}\left(\frac{E}{E_m}\right)^{\lambda-1}\left(1 - \frac{E}{E_m}\right)^{\mu-1} \tag{2}$$

$$F(E) = \frac{\Gamma(\lambda+\mu)}{\Gamma(\lambda)\Gamma(\mu)} \int_0^{E/E_m} t^{\lambda-1}(1-t)^{\mu-1} dt \tag{3}$$

In the above formulas, $E_m$ denotes a maximum value of the lighting intensity, and $\lambda$ and $\mu$ denote shape parameters of the Beta distribution.

A simulated lighting intensity is obtained through equivalent transformation of formulas (2) and (3) and expressed by formula (4):

$$E = E_m F^{-1}(E) \tag{4}$$

Output power of a fan depends on a wind speed of a nature wind, and the output power $P_w$ is expressed by formula (5):

$$P_w \begin{cases} 0 & 0 \le V_{ci} \\ (A+Bv+Cv^2)P_r & V_{ci} \le v < V_r \\ P_r & V_r \le v < V_{co} \\ 0 & V_{co} \le v \end{cases} \tag{5}$$

$$A = \frac{V_{ci}(V_{ci}+V_r) - 4V_{ci}V_r\left(\frac{V_{ci}+V_r}{2V_r}\right)^3}{(V_{ci}-V_r)^2} \tag{6}$$

$$B = \frac{-(V_{ci}+V_r) - 4V_{ci}V_r\left(\frac{V_{ci}+V_r}{2V_r}\right)^3}{(V_{ci}-V_r)^2} \tag{7}$$

$$C = \frac{2 - 4\left(\frac{V_{ci}+V_r}{2V_r}\right)^3}{(V_{ci}-V_r)^2} \tag{8}$$

In the above formulas, v denotes the wind speed of the nature wind, $V_r$ denotes a rated wind speed of the fan, $V_{ci}$ denotes a cut-in wind speed of the fan, $V_{co}$ denotes a cut-out wind speed of the fan, and A, B and C denote fitting coefficients of a nonlinear part of an output of the fan respectively. In the present application, v is 14 m/s, $V_{ci}$ is 4 m/s, and $V_{co}$ is 25 m/s.

The wind speed v approximately follows a Weibull distribution, and a probability density function $f(v)$ and a probability distribution function $F(v)$ of the wind speed v are respectively expressed as follows:

$$f(v) = \frac{s}{l}\left(\frac{v}{l}\right)^{s-1} \exp\left(-\left(\frac{v}{l}\right)^s\right) \tag{9}$$

$$F(v) = 1 - \exp\left(-\frac{v}{l}\right)^s \tag{10}$$

In the above formulas, s is a shape parameter of the Weibull distribution, and l is a scale parameter of the Weibull distribution. A simulated wind speed is obtained through equivalent transformation of formulas (9) and (10):

$$v = -l(\ln F)^{1/s} \tag{11}$$

(2) The timing feature of the distributed generator in the power distribution region is identified.

On the premise that the lighting intensity follows the Beta distribution and the wind speed follows the Weibull distribution, the parameters of the Beta distribution of the lighting intensity and the parameters of the Weibull distribution of the wind speed are solved by a maximum likelihood method and according to historical data of the lighting intensity and the wind speed measured in the power distribution region. Light irradiance satisfying the Beta distribution and the wind speed satisfying the Weibull distribution are simulated based on a Monte Carlo method, and the timing feature of a photovoltaic unit and the timing feature of the fan in the power distribution region are calculated according to output model formulas (1) and (5) of the photovoltaic generation and wind power generation.

In the maximum likelihood estimation, according to a principle of a maximum probability of occurrence of samples of the historical data of the wind speed and the lighting intensity in the region, estimated values of the parameters of the Beta distribution and the Weibull distribution are solved. In an example in which the parameters of the Beta distribution are solved, a logarithm likelihood function $L(\lambda,\mu)$ is constructed:

$$L(\lambda,\mu) = \sum_{i=1}^n \ln f(E_i) \tag{12}$$

Let:

$$F_1 = \frac{\partial L(\lambda,\mu)}{\partial \lambda} = 0, \text{ and} \tag{13}$$

$$F_2 = \frac{\partial L(\lambda,\mu)}{\partial \mu} = 0; \tag{14}$$

formulas (13) and (14) are iteratively solved by a Newton-Raphson method to obtain a corresponding correction equation:

$$\begin{bmatrix} F_1(\lambda,\mu) \\ F_2(\lambda,\mu) \end{bmatrix} = \begin{bmatrix} \frac{\partial F_1(\lambda,\mu)}{\partial \lambda} & \frac{\partial F_1(\lambda,\mu)}{\partial \mu} \\ \frac{\partial F_2(\lambda,\mu)}{\partial \lambda} & \frac{\partial F_2(\lambda,\mu)}{\partial \mu} \end{bmatrix} \begin{bmatrix} \Delta\lambda \\ \Delta\mu \end{bmatrix} = 0. \tag{15}$$

An appropriate initial value is selected according to the correction equation (15), and iterations are performed until a convergence criterion is satisfied. The parameters $\lambda$ and $\mu$ of the Beta distribution can be obtained after convergence. Similarly, the parameters s and l of the Weibull distribution can also be obtained.

(3) The timing feature of the load is analyzed.

There is a wide variety of loads which access the power distribution region, and different types of power loads have different characteristics. In order to optimize power supply access in the power distribution region, it is necessary to analyze the characteristics and power consumption habits of multiple types of loads. In the present application, historical load data of the user collected by a load control system is classified by using a fuzzy C-means (FCM) clustering algorithm, and multiple classes of class centers are extracted as timing features of the multiple types of loads respectively. Historical load data is normalized as $D_i$ and expressed as:

$$D_i=[d_{i,1},d_{i,2},\ldots,d_{i,j},\ldots,d_{i,m}] \quad (16).$$

In the formula, $d_{i,j}$ denotes active power of the load within a j-th period in an i-th piece of historical load data, and there are 96 sampling periods in total in one day. The historical load data is classified into L classes by the FCM algorithm, and a class center matrix X is expressed as:

$$X=[X_1,X_2,\ldots,X_k,\ldots,X_L]^T \quad (17).$$

A degree of membership $V_{i,k}$ of any one sample of the historical load data $D_i$ to a k-th class center $X_k$ satisfies:

$$\sum_{k=1}^{L} V_{i,k} = 1 \forall\, i = 1, 2, \ldots, N. \quad (18)$$

In the formula, N denotes a number of samples of the historical load data.

An objective function of the FCM is a minimum Euclidean distance from $D_i$ to the corresponding class center $X_k$, and may be expressed as:

$$\min F = \sum_{i=1}^{N}\sum_{k=1}^{L} V_{i,k}^2 \|D_i - X_k\|. \quad (19)$$

Formula (19) is solved through a lagrange transformation to obtain:

$$V_{i,k} = \|D_i - X_k\| \Big/ \sum_{k=1}^{L} \|D_i - X_k\| \quad (20)$$

$$X_k = \sum_{i=1}^{N} (V_{i,k}^2 D_i) \Big/ \sum_{i=1}^{N} V_{i,k}^2. \quad (21)$$

In the FCM, X and a degree-of-membership matrix V are updated by iterating formulas (20) and (21), and F in formula (19) is calculated until F no longer changes. An attribution timing feature of sample data is determined according to a maximum degree-of-membership principle, and if $D_i$ belongs to $X_k$, the degree of membership satisfies:

$$V_{i,k}=\max\{V_{i,1},V_{i,2},\ldots,V_{i,k}\ldots,V_{i,L}\} \quad (22),$$

where max{.} denotes a maximum value function.

(4) The timing feature of the load in the power distribution region is identified.

The timing feature of the load which accesses the power distribution region is accurately identified to provide a basis for optimized source-load access to the power distribution region. The present application identifies the timing feature of the load in the power distribution region through a decision tree model. The decision tree model is a widely used non-parametric classifier. A sample dataset is formed, and each sample has a set of attributes and corresponding categories which are determined in advance. Then a classifier may be obtained through learning. Finally, a new object can be correctly classified through the classifier.

A core of the decision tree model is construction of the classifier. In the present application, the classifier is constructed through the classification and regression trees (CART). A current node of the classifier is supposed to be t, a current sample dataset is S, the sample dataset is composed of M samples, and the M samples belong to L timing features. If a number of samples belonging to $X_k$ in t is $s_k$, a Gini index (GINI) characterizing an impurity degree of the current node is expressed as:

$$GINI(t) = 1 - \sum_{k=1}^{L} (p(X_k \mid t))^2. \quad (23)$$

In the above formula, $p(X_k|t)=s_k/M$ denotes a proportion of the samples belonging to $X_k$ in S. t is split by using a load characteristic index to generate two subnodes $t_R$ and $t_L$, where GINI of the subnodes are $GINI(t_R)$ and $GINI(t_L)$ and a reduction amount of the impurity degree in the splitting is:

$$\Phi(t)=GINI(t)-p_R GINI(t_R)-p_L GINI(t_L) \quad (24).$$

In the above formula, $p_L GINI(t_L)$ denotes a probability of assigning samples in t to $t_L$, and $p_R GINI(t_R)$ denotes a probability of assigning samples in t to $t_R$. A load characteristic index with a maximum impurity reduction amount is selected as a classification attribute.

The preceding process is repeated and the classification attribute is continuously selected until a minimum GINI is satisfied, to obtain a final classifier. Combining an installation requisition parameter of a new access user, the classifier can instruct the identification of the timing feature of the load in the power distribution region.

In an embodiment, the load characteristic index includes a load rate, a daily minimum load rate, a daily peak-valley rate, a peak load rate, a plateau load rate and a valley load rate.

In the embodiment of the present application, the user has the same meaning as the load, and the installation requisition parameter has the same meaning as the load characteristic index.

In step 20, the timing features of the distributed generator and the user in the power distribution region are inputted into the combination optimization model, and the source-load access feeder is determined through optimization thereby obtaining a power supply scheme.

The method of step 20 is described below.

After the source-load timing features in the access power distribution region are effectively identified, the present application provides the source-load cooperation access optimization model based on the timing features for the power distribution region to input the timing features of the distributed generator and the user in the power distribution region into the combination optimization model, and determine the source-load access feeder through optimization by a heuristic algorithm thereby obtaining the power supply scheme.

Supposing that a timing feature of a user i before access is identified as $A_i$, $A_i$ may be expressed as:

$$A_i=[A_{i,1},A_{i,2},\ldots,A_{i,k},\ldots,A_{i,24}] \quad (25).$$

As shown in FIG. 2, if n feeders are available for access in the power distribution region currently, a core of the combination optimization model is to determine a feeder which a certain user accesses, and a decision variable of the optimization model may be expressed by variables 0 and 1:

$$D_{i,k} = \begin{cases} 1, & \text{user } i \text{ accesses feeder } k \\ 0, & \text{Other} \end{cases} \quad (26)$$

A load of a k-th feeder before the user accesses the k-th feeder is $l_k$, and after the new user accesses, a load $L_k$ of the feeder may be updated as:

$$L_k = l_k + \sum_{i=1}^{n} D_{i,k} * A_i. \quad (27)$$

The combination optimization model targets the maximum power supply capability of the feeder:

$$\max G = \sum_{k=1}^{n} (P_{k,N} - P_{k,max}). \quad (28)$$

In the formula, n denotes a number of optional feeders, $P_{k,N}$ denotes an upper limit of an active transmission capacity of the k-th feeder, and $P_{k,max}$ denotes a maximum load of the k-th feeder.

Considering the safety of the power distribution region, it is also required that the daily peak load of each feeder is less than a rated transmission capacity of the feeder in the power distribution region, and the feeders have the following constraint:

$$P_{k,max} \leq P_{k,N} \quad (29).$$

Formula (25) to formula (29) constitute a source-load cooperation optimization access model provided by the present application, and an optimized result is solved through a particle swarm algorithm, so that a feeder access scheme in the power distribution region in the engineering is obtained.

An operation principle of the present application is described below.

Only an installation requisition value of the load or the distributed generator is considered for formulating a traditional power supply access scheme, and the access scheme is obtained through a sum of installation requisition values, which is quite different from the actual situation. For example, if a sum of installation requisition values of loads is greater than a sum of outputs of DGs, when the loads are at the peak and the outputs of the DGs are at the valley, a tidal current in the power distribution region is not reversed, but in some periods, when the outputs of the DGs are at the peak and the loads which access the power distribution region are smaller, the tidal current may be reversed. Considering the time distribution difference between a load demand and a DG output, an optimization space is provided for the source-load cooperation access. For example, two-shift and three-shift loads match with a photovoltaic output, and wind power generation matches with a night output. The wind power generation and the photovoltaic generation present complementary characteristics in time sequences. An output of the wind power generation is smaller, and an output of the photovoltaic generation is larger during the day, and the output of the wind power generation is larger, and the output of the photovoltaic generation is smaller at night. To sum up, only by comprehensively considering the timing features of the load and the DG, and utilizing the complementarity between timing power of the DG and the load, a load balance of the feeder in the power distribution region can be ensured in a planning stage through the optimized combination of the DG and the load, thereby achieving the economic operation of the power distribution region.

For this purpose, the source-load cooperation access method for the power distribution region provided by the present application fully takes into account the complementary characteristics of the timing features of the distributed generator and the user load as far as possible. The photovoltaic generation and the wind power generation, as representatives of distributed clean energy resources, generally distributedly access a low-voltage power distribution region and are consumed locally. Therefore, the DG in the present application refers to the photovoltaic generation and the wind power generation of the DG type. For the power distribution region shown in FIG. 2, in order to fully mine the source-load timing complementarity, a key is to effectively estimate the timing features of the distributed generator and the load which access the power distribution region. Considering that a main factor affecting the output power of photovoltaic generation and the wind power generation is a climatic environment, it is very important to clarify the timing distribution of the wind speed and illumination in the power distribution region for simulating the output of distributed generator. Therefore, in the present application, the timing feature model of the distributed generator and the timing feature model of the load are established respectively, and the timing feature of the distributed generator and the timing feature of the user which access the power distribution region are acquired by using the maximum likelihood estimation and the classification and regression trees, respectively. A power enterprise inputs the timing features of the distributed generator and the user in the power distribution region into the combination optimization model, and determines the source-load access feeder through optimization, thereby obtaining the power supply scheme.

In order to verify the effectiveness of the method proposed by the present application, a design of an actual power supply access scheme in the power distribution region of a certain company is used as an example for verification. In a certain power distribution region, there are 12 users, 2 photovoltaic units with same specifications and 2 fans with same specifications to be accessed, and there are two feeders available for access in the power distribution region. An original power supply scheme formulated by the power enterprise is shown in Table 1.

Firstly, according to the historical data of the lighting intensity and the wind measured in the power distribution region, the parameters $\lambda=0.61$ and $\mu=2.63$ of the Beta distribution and the parameters $s=2.43$ and $l=8.46$ of the Weibull distribution are obtained by using the maximum likelihood method. Then the light irradiance and the wind speed are simulated by the Monte Carlo method, and the timing feature of the photovoltaic unit and the timing feature of the fan are calculated according to formulas (1) and (5). On the other hand, 456 users are selected and classified into $L=6$ classes by the FCM algorithm to acquire load timing features, thereby acquiring source-load timing features of the power distribution region which are shown in FIG. 3A to FIG. 3H.

Figure 4:
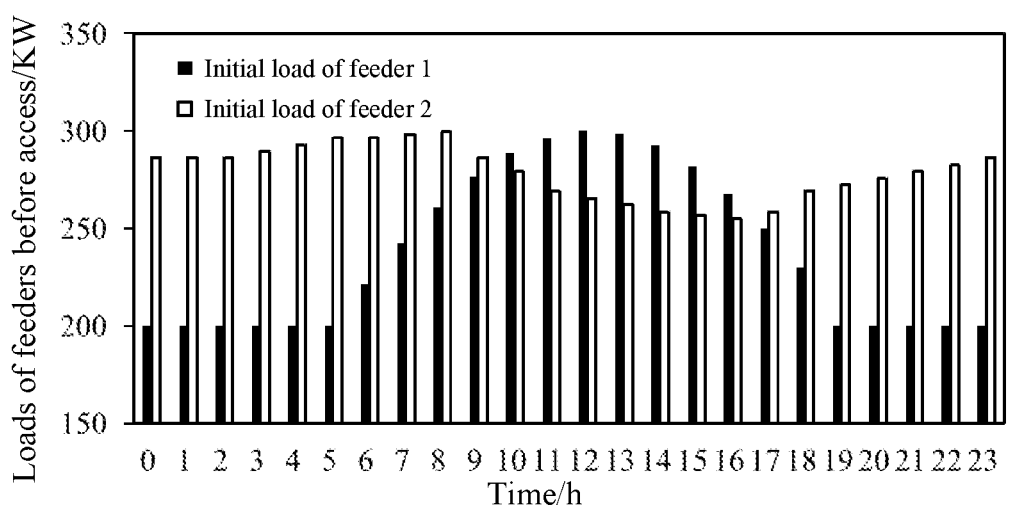
FIG. 4 is a schematic diagram of load data of feeders in a power distribution region before access according to an embodiment of the present application.

The power enterprise identifies an access user load among the existing load timing features by using the classifier mined by using the classification and regression trees (CART) in conjunction with the installation requisition parameter of the user. An identification situation of the user load is shown in Table 1. A load of a feeder in the power distribution region before access may be obtained by the load control system, models of feeder 1 and feeder 2 are YJV22–8.7/15 kV–3*25, and upper limits of the active transmission capacities of feeder1 and feeder 2 both are 1500 kW. Load data of the feeders in the power distribution region before the access is shown in FIG. 4, and a strategy obtained by solving the power supply access combination optimization model through optimization is shown in Table 1.

TABLE 1

Comparison of access schemes

|  | Feeder 1 | Feeder 2 |
|---|---|---|
| Traditional method | 1-5, fan #1, fan #2 | 6-14, photovoltaic unit #1, photovoltaic unit #2 |
| Optimization method in the present application | 2, 10, 13, photovoltaic unit #1, photovoltaic unit #2 | 1, 3-9, 11, 12, 14, fan #1, fan #2 |

Figure 5A:
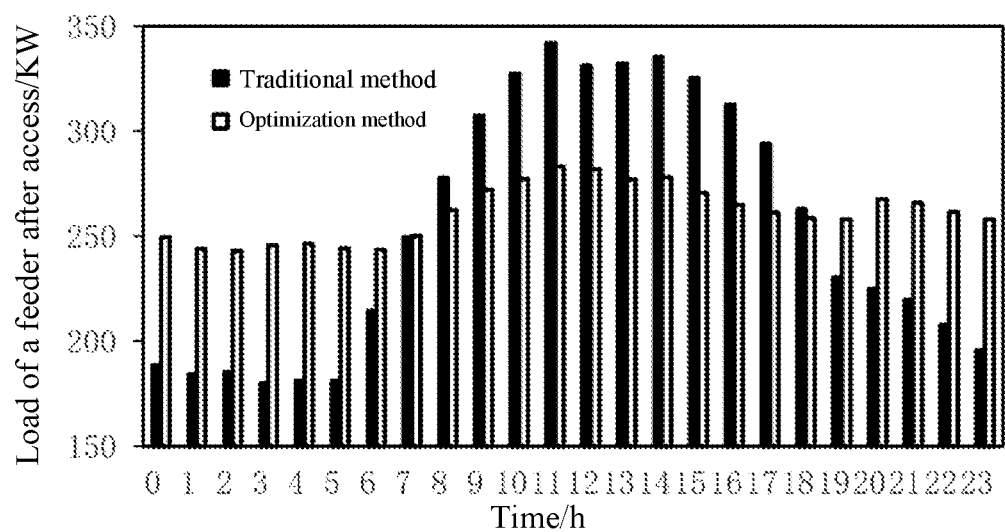
FIG. 5A is a comparison diagram of daily load curves of feeder 1 before and after optimization according to an embodiment of the present application.
Figure 5B:
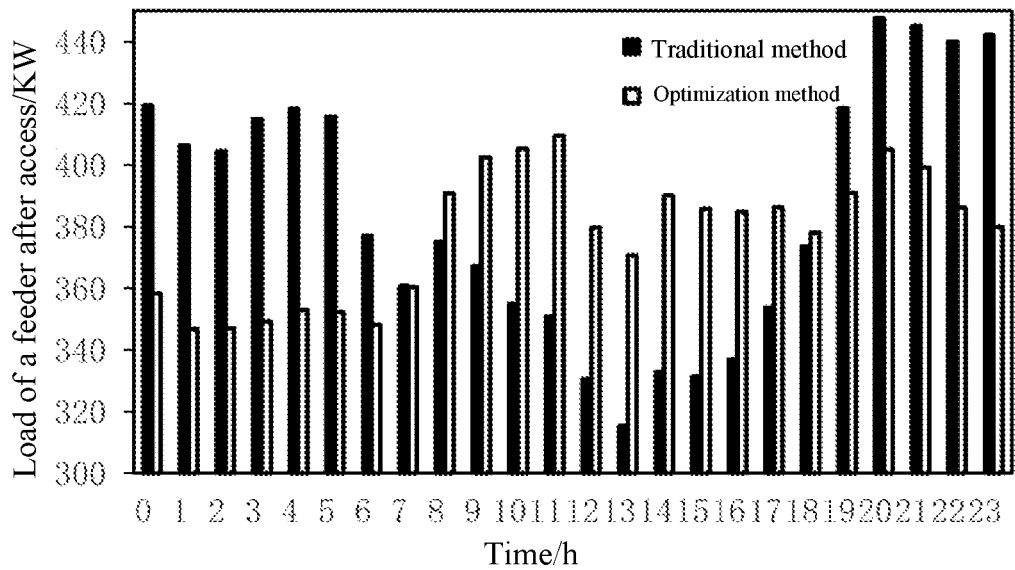
FIG. 5B is a comparison diagram of daily load curves of feeder 2 before and after optimization according to an embodiment of the present application.

Daily load curves of the feeders are calculated according to formula (27) for the traditional method and the optimization method, and are shown in FIG. 5A and FIG. 5B respectively. As can be seen from FIG. 5A and FIG. 5B, differences between the source-load timing features have an impact on the formulation of the access scheme. The reason is that by combining probability distribution characteristics in 24 time periods, the complementarity of the differences between the timing features of the DG and the load in different time periods may be taken into account. Therefore, the power supply capability of the region is significantly improved. Taking an original access scheme of feeder 1 as an example, the fan is planned to access feeder 1, and an initial load of feeder 1 is at the power consumption peak from 10:00 to 15:00. In the scheme of the present application, by using the complementarity of the source-load features, the photovoltaic unit whose output is at the peak at noon is switched to feeder 1, so that the peak of feeder 1 can be shaved.

In this embodiment, the loads of the feeder before and after the optimization are further examined through the daily load rate, the daily minimum load rate, and the daily peak-valley rate, and indexes of feeders 1 and 2 before and after the optimization are calculated and shown in Table 2.

TABLE 2

Calculation results of load characteristic indexes of feeders

| Feeder | Method | Load Rate | Daily Minimum Load Rate | Daily Peak-Valley Rate |
|---|---|---|---|---|
| Feeder 1 | Traditional method | 74.22% | 63.55% | 47.35% |
|  | Optimization method | 92.14% | 85.72% | 14.28% |
| Feeder 2 | Traditional method | 85.94% | 77.03% | 29.55% |
|  | Optimization method | 92.20% | 84.67% | 15.33% |

Many indexes of the optimized access considering the source-load features are superior to those of the traditional method. Taking feeder 1 as an example, compared with the traditional method, by adopting the optimization method, the daily load rate of the feeder is increased by 18%, the daily minimum load rate is increased by 22%, and the daily peak-valley rate is reduced by 33%.

What is claimed is:

1. A source-load cooperation access method for a power distribution region, comprising:

establishing, by a terminal, a timing feature model of a distributed generator and a timing feature model of a load respectively, acquiring, by the terminal, by using a maximum likelihood estimation and the timing feature model of the distributed generator, a timing feature of the distributed generator which accesses the power distribution region, and acquiring, by the terminal, by using a classification and regression tree and the timing feature model of the load, a timing feature of the load which accesses the power distribution region; and inputting, by the terminal, the timing feature of the distributed generator which accesses the power distribution region and the timing feature of the load which accesses the power distribution region into a combination optimization model, and determining a source-load access feeder through optimization;

wherein a timing feature of a new access load i is $A_1$, wherein $A_1$ is expressed as:

$$A_i = [A_{i,1}, A_{i,2}, \ldots, A_{i,k}, \ldots, A_{i,h}],$$

where h is a number of users;

wherein an access optimization model is used for determining a feeder which a certain load accesses in a case where n feeders are available for access in the access power distribution region, and a decision variable of the combination optimization model is capable of being expressed by variables 0 and 1:

$$D_{i,k} = \begin{cases} 1, & \text{A load } i \text{ accesses a feeder } k \\ 0, & \text{Other} \end{cases},$$

a load of a k-th feeder before the load accesses the k-th feeder is $l_k$, and after a new load accesses, a load $L_k$ of the feeder is updated as:

$$L_k = l_k + \sum_{i=1}^{n} D_{i,k} \cdot A_i,$$

the combination optimization model targets a maximum power supply capability of the feeder, and an objective function of the combination optimization model is:

$$\max G = \sum_{k=1}^{n} (P_{k,N} - P_{k,max}),$$

where n denotes a number of optional feeders, $P_{k,N}$ denotes an upper limit of an active transmission capacity of the k-th feeder, and $P_{k,max}$ denotes a maximum load of the k-th feeder; and wherein each feeder in the access power distribution region satisfies a following constraint condition: $P_{k,max} \leq P_{k,N}$.

2. The method of claim 1, wherein establishing, by the terminal, the timing feature model of the distributed generator comprises:

establishing, by the terminal, a timing feature model for photovoltaic generation:

$$P_s = ED\eta,$$

where $P_s$ denotes output power of the photovoltaic generation, E denotes a lighting intensity, D denotes an area of a photovoltaic panel and $\eta$ denotes light energy conversion efficiency; and establishing, by the terminal, a timing feature model of a fan:

$$P_w = \begin{cases} 0 & 0 \leq V_{ci} \\ (A + Bv + Cv^2)P_r & V_{ci} \leq v < V_r \\ P_r & V_r \leq v < V_{co} \\ 0 & V_{co} \leq v \end{cases},$$

$$A = \frac{V_{ci}(V_{ci} + V_r) - 4V_{ci}V_r\left(\frac{V_{ci} + V_r}{2V_r}\right)^3}{(V_{ci} + V_r)^2},$$

$$B = \frac{-(V_{ci} + V_r) - 4V_{ci}V_r\left(\frac{V_{ci} + V_r}{2V_r}\right)^3}{(V_{ci} + V_r)^2}, \text{ and}$$

$$C = \frac{2 - 4\left(\frac{V_{ci} + V_r}{2V_r}\right)^3}{(V_{ci} + V_r)^2};$$

where $P_w$ denotes output power of the fan, v denotes a wind speed of nature wind, $V_r$ denotes a rated wind speed of the fan, $V_{ci}$ denotes a cut-in wind speed of the fan, $V_{co}$ denotes a cut-out wind speed of the fan, $P_r$ denotes rated output power of the fan, and A, B and C denote fitting coefficients of a nonlinear part of an output of the fan respectively, wherein $V_{cs}$ 4 m/s, and $V_{co}$ is 25 m/s;

acquiring, by the terminal, by using the maximum likelihood estimation and the timing feature model of the distributed generator, the timing feature of the distributed generator which accesses the power distribution region comprises: in a case where the lighting intensity follows a Beta distribution, solving, by the terminal, shape parameters $\lambda$ and $\mu$ of the Beta distribution of the lighting intensity by a maximum likelihood method and according to historical data of the lighting intensity measured in the access power distribution region; simulating, by the terminal, the lighting intensity satisfying the Beta distribution based on the shape parameters $\lambda$ and $\mu$ of the Beta distribution of the lighting intensity and by a Monte Carlo method, and calculating, by the terminal, a timing feature of a photovoltaic unit in the access power distribution region according to the timing feature model for the photovoltaic generation and the simulated lighting intensity; in a case where the wind speed of the nature wind follows a Weibull distribution, solving, by the terminal, a shape parameter s and a scale parameter l of the Weibull distribution of the wind speed of the nature wind by the maximum likelihood method and according to historical data of the wind speed of the nature wind measured in the access power distribution region; and simulating, by the terminal, the wind speed of the nature wind satisfying the Weibull distribution based on the shape parameter s and the scale parameter l of the Weibull distribution of the wind speed of the nature wind and by the Monte Carlo method, and calculating, by the terminal, a timing feature of the fan in the access power distribution region according to the timing feature model of the fan and the simulated wind speed of the nature wind;

establishing, by the terminal, the timing feature model of the load comprises: classifying, by the terminal, a plurality of pieces of historical load data collected by a load control system by using a fuzzy C-means (FCM) clustering algorithm to obtain a plurality of classes of load data, and extracting, by the terminal, a class center of each of the plurality of classes of load data as a timing feature of the each of the plurality of classes of load data;

acquiring, by the terminal, by using the classification and regression tree and the timing feature model of the load, the timing feature of the load which accesses the power distribution region comprises:

constructing, by the terminal, a classifier through a classification and regression tree (CART);

wherein the constructing a classifier through the CART comprises:

supposing that a current node of the classifier is t, a sample dataset of the current node is S and the sample dataset is composed of M samples, and determining through the timing feature model of the load that the M samples belong to L timing features, wherein L is an integer greater than 0; in a case where a number of samples belonging to a k-th class center $X_k$ in t is $s_k$, expressing a Gini index (GINI) characterizing an impurity degree of the current node t as:

$$GINI(t) = 1 - \sum_{k=1}^{L} (p(X_k \mid t))^2;$$

where $p(X_k|t) = s_k/M$ denotes a proportion of the samples belonging to $X_k$ in S; and splitting t by using a load characteristic index to generate two subnodes $t_R$ and $t_L$, wherein GINI of the subnodes are GINI($t_R$) and GINI($t_L$), and a reduction amount of the impurity degree in the splitting is:
Φ(t)=GINI(t)−p_R GINI(t_R)−p_L GINI(t_L);

where $p_L GINI(t_L)$ denotes a probability of assigning samples in t to $t_L$, $p_R GINI(t_R)$ denotes a probability of assigning samples in t to $t_R$, and a load characteristic index with a maximum impurity reduction amount is selected as a classification attribute; and repeating the preceding process and continuously selecting the classification attribute until a minimum GINI is satisfied, to obtain a final classifier; and identifying, by the terminal, according to an installation requisition parameter of a new access load and the classifier, a load timing feature of the new access load in the access power distribution region.

3. The method of claim 2, wherein solving, by the terminal, the shape parameters λ and μ of the Beta distribution of the lighting intensity by the maximum likelihood method and according to the historical data of the lighting intensity measured in the access power distribution region comprises: constructing, by the terminal, a logarithm likelihood function L(λ,μ):

$$L(\lambda, \mu) = \sum_{i=1}^{n} \ln f(E_i);$$

where $E_i$ denotes a lighting intensity at a moment i;
let $$F_1 = \frac{\partial L(\lambda, \mu)}{\partial \lambda} = 0, \text{ and}$$

$$F_2 = \frac{\partial L(\lambda, \mu)}{\partial \mu} = 0;$$

iteratively solving $F_1$ and $F_2$ by a Newton-Raphson method to obtain a correction equation:

$$\begin{bmatrix} F_1(\lambda, \mu) \\ F_2(\lambda, \mu) \end{bmatrix} = \begin{bmatrix} \frac{\partial F_1(\lambda, \mu)}{\partial \lambda} & \frac{\partial F_1(\lambda, \mu)}{\partial \mu} \\ \frac{\partial F_2(\lambda, \mu)}{\partial \lambda} & \frac{\partial F_2(\lambda, \mu)}{\partial \mu} \end{bmatrix} \begin{bmatrix} \Delta \lambda \\ \Delta \mu \end{bmatrix} = 0;$$

selecting, by the terminal, an initial value according to the correction equation, and performing, by the terminal, iterations until a convergence criterion is satisfied to obtain the shape parameters λ and μ of the Beta distribution; and solving, by the terminal, the shape parameter S and the scale parameter l of the Weibull distribution of the wind speed of the nature wind by the maximum likelihood method and according to the historical data of the wind speed of the nature wind measured in the access power distribution region comprises:

$$L(s, l) = \sum_{i=1}^{n} \ln f(v_i);$$

where $v_i$ denotes a wind speed of the nature wind at the moment i;
let $$F_3 = \frac{\partial L(s, l)}{\partial s} = 0, \text{ and}$$

$$F_4 = \frac{\partial L(s, l)}{\partial l} = 0;$$

iteratively solving, by the terminal, $F_3$ and $F_4$ by the Newton-Raphson method to obtain a correction equation:

$$\begin{bmatrix} F_3(s, l) \\ F_4(s, l) \end{bmatrix} = \begin{bmatrix} \frac{\partial F_3(s, l)}{\partial s} & \frac{\partial F_3(s, l)}{\partial l} \\ \frac{\partial F_4(s, l)}{\partial s} & \frac{\partial F_4(s, l)}{\partial l} \end{bmatrix} \begin{bmatrix} \Delta s \\ \Delta l \end{bmatrix} = 0;$$

selecting, by the terminal, an initial value according to the correction equation, and performing, by the terminal, iterations until a convergence criterion is satisfied to obtain the shape parameter s and the scale parameter l of the Weibull distribution.

4. The method of claim 3, wherein simulating, by the terminal, the lighting intensity satisfying the Beta distribution based on the shape parameters λ and μ of the Beta distribution of the lighting intensity and by the Monte Carlo method comprises:

acquiring, by the terminal, a probability distribution function F(E) of the lighting intensity E based on the shape parameters λ and μ of the Beta distribution of the lighting intensity, and simulating, by the terminal, the lighting intensity satisfying the Beta distribution according to the probability distribution function F(E) of the lighting intensity E and by the Monte Carlo method;
wherein $$f(E) = \frac{\Gamma(\lambda + \mu)}{\Gamma(\lambda)\Gamma(\mu)} \left(\frac{E}{E_m}\right)^{\lambda-1} \left(1 - \frac{E}{E_m}\right)^{\mu-1}, \text{ and}$$

$$F(E) = \frac{\Gamma(\lambda + \mu)}{\Gamma(\lambda)\Gamma(\mu)} \int_0^{E/E_m} t^{\lambda-1}(1-t)^{\mu-1} dt;$$

where Γ(.) denotes a gamma function, $E_m$ denotes a maximum value of the lighting intensity, and λ and μ denote the shape parameters of the Beta distribution; and simulating, by the terminal, the wind speed of the nature wind satisfying the Weibull distribution based on the shape parameter s and the scale parameter l of the Weibull distribution of the wind speed of the nature wind and by the Monte Carlo method comprises:

acquiring, by the terminal, a probability distribution function F(v) of the wind speed v of the nature wind based on the shape parameter s and the scale parameter l of the Weibull distribution of the wind speed of the nature wind, and simulating, by the terminal, the wind speed of the nature wind satisfying the Weibull distribution according to the probability distribution function F(v) of the wind speed v of the nature wind and by the Monte Carlo method;

wherein the probability distribution function F(v) of the wind speed v of the nature wind is:

$$F(v) = 1 - \exp\left(-\frac{v}{l}\right)^s;$$

where s is the shape parameter of the Weibull distribution, and l is the scale parameter of the Weibull distribution.

5. The method of claim 2, wherein classifying, by the terminal, the plurality of pieces of historical load data collected by the load control system by using the fuzzy C-means (FCM) clustering algorithm to obtain the plurality of classes of load data comprises:

for the plurality of pieces of historical load data, classifying, by the terminal, the plurality of pieces of historical load data into L classes by using the FCM algorithm, wherein an i-th piece of historical load data is normalized as $D_i$ and expressed as:

$$D_i = [d_{i,1}, d_{i,2}, \ldots, d_{i,j}, \ldots, d_{i,m}],$$

where denotes active power of the load within a j-th period in the i-th piece of historical load data, m denotes a number of sampling periods in one day, and i is an integer greater than 0;

a class center matrix X is expressed as:

$$X = [X_1, X_2, \ldots, X_k, \ldots, X_L]^T;$$

a degree of membership $V_{i,k}$ of $D_i$ to the k-th class center $X_k$ satisfies a following condition:

$$\sum_{k=1}^{L} V_{i,k} = 1 \,\forall\, i = 1, 2, \ldots, N;$$

where N denotes a number of samples of the historical load data;

an objective function of the FCM is:

$$\min F = \sum_{i=1}^{N} \sum_{k=1}^{L} V_{i,k}^2 \|D_i - X_k\|;$$

solving, by the terminal, the above formula through a lagrange transformation to obtain:

$$V_{i,k} = \|D_i - X_k\| \Big/ \sum_{k=1}^{L} \|D_i - X_k\|, \text{ and}$$

$$X_k = \sum_{i=1}^{N} (V_{i,k}^2 D_i) \Big/ \sum_{i=1}^{N} V_{i,k}^2;$$

updating, by the terminal, the class center matrix X and a degree-of-membership matrix V through iterations in the FCM, calculating the objective function F of the FCM until F no longer changes, and determining an attribution timing feature of the plurality of pieces of historical load data according to a maximum degree-of-membership principle; wherein in a case where $D_i$ belongs to $X_k$, $V_{i,k}$ satisfies:

$$V_{i,k} = \max\{V_{i,1}, V_{i,2}, \ldots, V_{i,k}, \ldots, V_{i,L}\},$$

where max{.} denotes a maximum value function.

6. A terminal, comprising a processor and a memory for storing programs, wherein when executed by the processor, the programs implement the following steps:

establishing a timing feature model of a distributed generator and a timing feature model of a load respectively;
acquiring, by using a maximum likelihood estimation and the timing feature model of the distributed generator, a timing feature of the distributed generator which accesses the power distribution region, and acquiring, by using a classification and regression tree and the timing feature model of the load, a timing feature of the load which accesses the power distribution region; and
inputting the timing feature of the distributed generator which accesses the power distribution region and the timing feature of the load which accesses the power distribution region into a combination optimization model, and determining a source-load access feeder through optimization;

wherein:

a timing feature of a new access load i is $A_i$, wherein $A_i$ is expressed as:

$$A_i = [A_{i,1}, A_{i,2}, \ldots, A_{i,k}, \ldots, A_{i,h}],$$

where h is a number of users;
an access optimization model is used for determining a feeder which a certain load accesses in a case where n feeders are available for access in the access power distribution region, and a decision variable of the combination optimization model is capable of being expressed by variables 0 and 1:

$$D_{i,k} = \begin{cases} 1, & \text{A load } i \text{ accesses a feeder } k \\ 0, & \text{Other} \end{cases},$$

a load of a k-th feeder before the load accesses the k-th feeder is $l_k$, and after a new load accesses, a load $L_k$ of the feeder is updated as:

$$L_k = l_k + \sum_{i=1}^{n} D_{i,k} \cdot A_i,$$

the combination optimization model targets a maximum power supply capability of the feeder, and an objective function of the combination optimization model is:

$$\max G = \sum_{k=1}^{n} (P_{k,N} - P_{k,max}),$$

where n denotes a number of optional feeders, $P_{k,N}$ denotes an upper limit of an active transmission capacity of the k-th feeder, and $P_{k,max}$ denotes a maximum load of the k-th feeder; and
each feeder in the access power distribution region satisfies a following constraint condition: $P_{k,max} \leq P_{k,N}$.

7. A non-transitory computer-readable storage medium, which is configured to store computer programs, wherein when executed by a processor, the computer programs implement following steps:

establishing a timing feature model of a distributed generator and a timing feature model of a load respectively, acquiring, by using a maximum likelihood estimation and the timing feature model of the distributed generator, a timing feature of the distributed generator which accesses the power distribution region, and acquiring, by using a classification and regression tree and the timing feature model of the load, a timing feature of the load which accesses the power distribution region; and inputting the timing feature of the distributed generator which accesses the power distribution region and the timing feature of the load which accesses the power distribution region into a combination optimization model, and determining a source-load access feeder through optimization;

wherein a timing feature of a new access load i is $A_i$, wherein $A_i$ is expressed as:

$$A_i = [A_{i,1}, A_{i,2}, \ldots, A_{i,k}, \ldots, A_{i,h}],$$

where h is a number of users;

an access optimization model is used for determining a feeder which a certain load accesses in a case where n feeders are available for access in the access power distribution region, and a decision variable of the combination optimization model is capable of being expressed by variables 0 and 1:

$$D_{i,k} = \begin{cases} 1, & \text{A load } i \text{ accesses a feeder } k \\ 0, & \text{Other} \end{cases},$$

a load of a k-th feeder before the load accesses the k-th feeder is $l_k$, and after a new load accesses, a load $L_k$ of the feeder is updated as:

$$L_k = I_k + \sum_{i=1}^{n} D_{i,k} \cdot A_i,$$

the combination optimization model targets a maximum power supply capability of the feeder, and an objective function of the combination optimization model is:

$$\max G = \sum_{k=1}^{n}(P_{k \cdot N} - P_{k \cdot max}),$$

where n denotes a number of optional feeders, $P_{k,N}$ denotes an upper limit of an active transmission capacity of the k-th feeder, and $P_{k,max}$ denotes a maximum load of the k-th feeder; and each feeder in the access power distribution region satisfies a following constraint condition: $P_{k,max} \leq P_{k,N}$.

8. The method of claim 3, wherein classifying, by the terminal, the plurality of pieces of historical load data collected by the load control system by using the fuzzy C-means (FCM) clustering algorithm to obtain the plurality of classes of load data comprises:

for the plurality of pieces of historical load data, classifying, by the terminal, the plurality of pieces of historical load data into L classes by using the FCM algorithm, wherein an i-th piece of historical load data is normalized as $D_i$ and expressed as:

$$D_i = [d_{i,1}, d_{i,2}, \ldots, d_{i,j}, \ldots, d_{i,m}],$$

where $d_{i,j}$ denotes active power of the load within a j-th period in the i-th piece of historical load data, m denotes a number of sampling periods in one day, and i is an integer greater than 0;

a class center matrix X is expressed as:

$$X = [X_1, X_2, \ldots, X_k, \ldots, X_L]^T;$$

a degree of membership $V_{i,k}$ of $D_i$ to the k-th class center $X_k$ satisfies a following condition:

$$\sum_{k=1}^{L} V_{i,k} = 1 \; \forall \; i = 1, 2, \ldots, N;$$

where N denotes a number of samples of the historical load data;

an objective function of the FCM is:

$$\min F = \sum_{i=1}^{N}\sum_{k=1}^{L} V_{i,k}^2 \|D_i - X_k\|;$$

solving, by the terminal, the above formula through a lagrange transformation to obtain:

$$V_{i,k} = \|D_i - X_k\| \Big/ \sum_{k=1}^{L} \|D_i - X_k\|, \text{ and}$$

$$X_k = \sum_{i=1}^{N}(V_{i,k}^2 D_i) \Big/ \sum_{i=1}^{N} V_{i,k}^2;$$

updating, by the terminal, the class center matrix X and a degree-of-membership matrix V through iterations in the FCM, calculating the objective function F of the FCM until F no longer changes, and determining an attribution timing feature of the plurality of pieces of historical load data according to a maximum degree-of-membership principle; wherein in a case where $D_i$ belongs to $X_k$, $V_{i,k}$ satisfies:

$$V_{i,k} = \max\{V_{i,1}, V_{i,2}, \ldots, V_{i,k}, \ldots, V_{i,L}\},$$

where max{.} denotes a maximum value function.

9. The method of claim 4, wherein classifying, by the terminal, the plurality of pieces of historical load data collected by the load control system by using the fuzzy C-means (FCM) clustering algorithm to obtain the plurality of classes of load data comprises:

for the plurality of pieces of historical load data, classifying, by the terminal, the plurality of pieces of historical load data into L classes by using the FCM algorithm, wherein an i-th piece of historical load data is normalized as $D_i$ and expressed as:

$$D_i = [d_{i,1}, d_{i,2}, \ldots, d_{i,j}, \ldots, d_{i,m}],$$

where $d_{i,j}$ denotes active power of the load within a j-th period in the i-th piece of historical load data, m denotes a number of sampling periods in one day, and i is an integer greater than 0;

a class center matrix X is expressed as:

$$X = [X_1, X_2, \ldots, X_k, \ldots, X_L]^T;$$

a degree of membership $V_k$ of $D_i$ to the k-th class center $X_k$ satisfies a following condition:

$$\sum_{k=1}^{L} V_{i,k} = 1 \ \forall \ i = 1, 2, \ldots, N;$$

where N denotes a number of samples of the historical load data;

an objective function of the FCM is:

$$\min F = \sum_{i=1}^{N} \sum_{k=1}^{L} V_{i,k}^2 \|D_i - X_k\|;$$

solving, by the terminal, the above formula through a lagrange transformation to obtain:

$$V_{i,k} = \|D_i - X_k\| \bigg/ \sum_{k=1}^{L} \|D_i - X_k\|, \text{ and}$$

$$X_k = \sum_{i=1}^{N} (V_{i,k}^2 D_i) \bigg/ \sum_{i=1}^{N} V_{i,k}^2;$$

updating, by the terminal, the class center matrix X and a degree-of-membership matrix V through iterations in the FCM, calculating the objective function F of the FCM until F no longer changes, and determining an attribution timing feature of the plurality of pieces of historical load data according to a maximum degree-of-membership principle; wherein in a case where $D_i$ belongs to $X_k$, $V_{i,k}$ satisfies:

$$V_{i,k} = \max\{V_{i,1}, V_{i,2}, \ldots, V_{i,k}, \ldots, V_{i,L}\},$$

where max{.} denotes a maximum value function.

10. The terminal of claim 6, wherein establishing the timing feature model of the distributed generator comprises:

establishing a timing feature model for photovoltaic generation:

$$P_s = ED\eta,$$

where $P_s$ denotes output power of the photovoltaic generation, E denotes a lighting intensity, D denotes an area of a photovoltaic panel and $\eta$ denotes light energy conversion efficiency; and establishing a timing feature model of a fan:

$$P_w = \begin{cases} 0 & 0 \leq V_{ci} \\ (A + Bv + Cv^2)P_r & V_{ci} \leq v < V_r \\ P_r & V_r \leq v < V_{co} \\ 0 & V_{co} \leq v \end{cases},$$

$$A = \frac{V_{ci}(V_{ci} + V_r) - 4V_{ci}V_r\left(\frac{V_{ci} + V_r}{2V_r}\right)^3}{(V_{ci} - V_r)^2},$$

$$B = \frac{-(V_{ci} + V_r) - 4V_{ci}V_r\left(\frac{V_{ci} + V_r}{2V_r}\right)^3}{(V_{ci} - V_r)^2}, \text{ and}$$

$$C = \frac{2 - 4\left(\frac{V_{ci} + V_r}{2V_r}\right)^3}{(V_{ci} - V_r)^2};$$

where $P_w$ denotes output power of the fan, v denotes a wind speed of nature wind, $V_r$ denotes a rated wind speed of the fan, $V_{ci}$ denotes a cut-in wind speed of the fan, $V_{co}$ denotes a cut-out wind speed of the fan, $P_r$ denotes rated output power of the fan, and A, B and C denote fitting coefficients of a nonlinear part of an output of the fan respectively, wherein $V_{ci}$ 4 m/s, and $V_{co}$ is 25 m/s;

acquiring, by using the maximum likelihood estimation and the timing feature model of the distributed generator, the timing feature of the distributed generator which accesses the power distribution region comprises: in a case where the lighting intensity follows a Beta distribution, solving shape parameters $\lambda$ and $\mu$ of the Beta distribution of the lighting intensity by a maximum likelihood method and according to historical data of the lighting intensity measured in the access power distribution region; simulating the lighting intensity satisfying the Beta distribution based on the shape parameters $\lambda$ and $\mu$ of the Beta distribution of the lighting intensity and by a Monte Carlo method, and calculating a timing feature of a photovoltaic unit in the access power distribution region according to the timing feature model for the photovoltaic generation and the simulated lighting intensity; in a case where the wind speed of the nature wind follows a Weibull distribution, solving a shape parameter s and a scale parameter l of the Weibull distribution of the wind speed of the nature wind by the maximum likelihood method and according to historical data of the wind speed of the nature wind measured in the access power distribution region; and simulating the wind speed of the nature wind satisfying the Weibull distribution based on the shape parameter s and the scale parameter l of the Weibull distribution of the wind speed of the nature wind and by the Monte Carlo method, and calculating a timing feature of the fan in the access power distribution region according to the timing feature model of the fan and the simulated wind speed of the nature wind;

establishing the timing feature model of the load comprises: classifying a plurality of pieces of historical load data collected by a load control system by using a fuzzy C-means (FCM) clustering algorithm to obtain a plurality of classes of load data, and extracting a class center of each of the plurality of classes of load data as a timing feature of the each of the plurality of classes of load data;

acquiring, by using the classification and regression tree and the timing feature model of the load, the timing feature of the load which accesses the power distribution region comprises:

constructing a classifier through a classification and regression tree (CART);

wherein the constructing a classifier through the CATR comprises:

supposing that a current node of the classifier is t, a sample dataset of the current node is S and the sample dataset is composed of M samples, and determining through the timing feature model of the load that the M samples belong to L timing features, wherein L is an integer greater than 0; in a case where a number of samples belonging to a k-th class center $X_k$ in t is $s_k$, expressing a Gini index (GINI) characterizing an impurity degree of the current node t as:

$$GINI(t) = 1 - \sum_{k=1}^{L} (p(X_k | t))^2;$$

where $p(X_k|t)=s_k/M$ denotes a proportion of the samples belonging to $X_k$ in S; and splitting t by using a load characteristic index to generate two subnodes $t_R$ and $t_L$, wherein GINI of the subnodes are $GINI(t_R)$ and $GINI(t_L)$, and a reduction amount of the impurity degree in the splitting is: $\Phi(t)=GINI(t)-p_R GINI(t_R)-p_L GINI(t_L)$;

where $p_L GINI(t_L)$ denotes a probability of assigning samples in t to $t_L$, $p_R GINI(t_R)$ denotes a probability of assigning samples in t to $t_R$, and a load characteristic index with a maximum impurity reduction amount is selected as a classification attribute; and repeating the preceding process and continuously selecting the classification attribute until a minimum GINI is satisfied, to obtain a final classifier; and identifying, according to an installation requisition parameter of a new access load and the classifier, a load timing feature of the new access load in the access power distribution region.

11. The terminal of claim 10, wherein solving the shape parameters λ and μ of the Beta distribution of the lighting intensity by the maximum likelihood method and according to the historical data of the lighting intensity measured in the access power distribution region comprises: constructing a logarithm likelihood function $L(\lambda,\mu)$:

$$L(\lambda, \mu) = \sum_{i=1}^{n} \ln f(E_i);$$

where $E_i$ denotes a lighting intensity at a moment i; let $$F_1 = \frac{\partial L(\lambda, \mu)}{\partial \lambda} = 0, \text{ and}$$

$$F_2 = \frac{\partial L(\lambda, \mu)}{\partial \mu} = 0;$$

iteratively solving $F_1$ and $F_2$ by a Newton-Raphson method to obtain a correction equation:

$$\begin{bmatrix} F_1(\lambda, \mu) \\ F_2(\lambda, \mu) \end{bmatrix} = \begin{bmatrix} \frac{\partial F_1(\lambda, \mu)}{\partial \lambda} & \frac{\partial F_1(\lambda, \mu)}{\partial \mu} \\ \frac{\partial F_2(\lambda, \mu)}{\partial \lambda} & \frac{\partial F_2(\lambda, \mu)}{\partial \mu} \end{bmatrix} \begin{bmatrix} \Delta\lambda \\ \Delta\mu \end{bmatrix} = 0;$$

selecting an initial value according to the correction equation, and performing iterations until a convergence criterion is satisfied to obtain the shape parameters λ and μ of the Beta distribution; and solving the shape parameter s and the scale parameter l of the Weibull distribution of the wind speed of the nature wind by the maximum likelihood method and according to the historical data of the wind speed of the nature wind measured in the access power distribution region comprises:

$$L(s, l) = \sum_{i=1}^{n} \ln f(v_i)$$

where $v_i$ denotes a wind speed of the nature wind at the moment i; let $$F_3 = \frac{\partial L(s, l)}{\partial s} = 0, \text{ and}$$

$$F_4 = \frac{\partial L(s, l)}{\partial l} = 0;$$

iteratively solving $F_3$ and $F_4$ by the Newton-Raphson method to obtain a correction equation:

$$\begin{bmatrix} F_3(s, l) \\ F_4(s, l) \end{bmatrix} = \begin{bmatrix} \frac{\partial F_3(s, l)}{\partial s} & \frac{\partial F_3(s, l)}{\partial l} \\ \frac{\partial F_4(s, l)}{\partial s} & \frac{\partial F_4(s, l)}{\partial l} \end{bmatrix} \begin{bmatrix} \Delta s \\ \Delta l \end{bmatrix} = 0;$$

selecting an initial value according to the correction equation, and performing iterations until a convergence criterion is satisfied to obtain the shape parameter S and the scale parameter l of the Weibull distribution.

12. The terminal of claim 11, wherein simulating the lighting intensity satisfying the Beta distribution based on the shape parameters λ and μ of the Beta distribution of the lighting intensity and by the Monte Carlo method comprises:

acquiring a probability distribution function F(E) of the lighting intensity E based on the shape parameters λ and μ of the Beta distribution of the lighting intensity, and simulating the lighting intensity satisfying the Beta distribution according to the probability distribution function F(E) of the lighting intensity E and by the Monte Carlo method;

wherein $$f(E) = \frac{\Gamma(\lambda+\mu)}{\Gamma(\lambda)\Gamma(\mu)} \left(\frac{E}{E_m}\right)^{\lambda-1} \left(1 - \frac{E}{E_m}\right)^{\mu-1}, \text{ and}$$

$$F(E) = \frac{\Gamma(\lambda+\mu)}{\Gamma(\lambda)\Gamma(\mu)} \int_{0}^{E/E_m} t^{\lambda-1}(1-t)^{\mu-1} dt;$$

where $\Gamma(.)$ denotes a gamma function, $E_m$ denotes a maximum value of the lighting intensity, and λ and μ denote the shape parameters of the Beta distribution; and simulating the wind speed of the nature wind satisfying the Weibull distribution based on the shape parameter S and the scale parameter l of the Weibull distribution of the wind speed of the nature wind and by the Monte Carlo method comprises:

acquiring a probability distribution function F(v) of the wind speed v of the nature wind based on the shape parameter s and the scale parameter l of the Weibull distribution of the wind speed of the nature wind, and simulating the wind speed of the nature wind satisfying the Weibull distribution according to the probability distribution function F(v) of the wind speed v of the nature wind and by the Monte Carlo method;

wherein the probability distribution function F(v) of the wind speed v of the nature wind is:

$$F(v) = 1 - \exp\left(-\frac{v}{l}\right)^s;$$

where s is the shape parameter of the Weibull distribution, and l is the scale parameter of the Weibull distribution.

13. The terminal of claim 10, wherein classifying the plurality of pieces of historical load data collected by the load control system by using the fuzzy C-means (FCM) clustering algorithm to obtain the plurality of classes of load data comprises:

for the plurality of pieces of historical load data, classifying the plurality of pieces of historical load data into L classes by using the FCM algorithm, wherein an i-th piece of historical load data is normalized as $D_i$ and expressed as:

$$D_i=[d_{i,1},d_{i,2},\ldots,d_{i,j},\ldots,d_{i,m}],$$

where $d_{i,j}$ denotes active power of the load within a j-th period in the i-th piece of historical load data, m denotes a number of sampling periods in one day, and i is an integer greater than 0;

a class center matrix X is expressed as:

$$X=[X_1,X_2,\ldots,X_k,\ldots,X_L]^T;$$

a degree of membership $V_{i,k}$ of $D_i$ to the k-th class center $X_k$ satisfies a following condition:

$$\sum_{k=1}^{L} V_{i,k} = 1 \ \forall \ i = 1, 2, \ldots, N;$$

where N denotes a number of samples of the historical load data;

an objective function of the FCM is:

$$\min F = \sum_{i=1}^{N}\sum_{k=1}^{L} V_{i,k}^2 \|D_i - X_k\|;$$

solving the above formula through a lagrange transformation to obtain:

$$V_{i,k} = \|D_i - X_k\| \bigg/ \sum_{k=1}^{L} \|D_i - X_k\|, \text{ and}$$

$$X_k = \sum_{i=1}^{N}(V_{i,k}^2 D_i) \bigg/ \sum_{i=1}^{N} V_{i,k}^2;$$

updating the class center matrix X and a degree-of-membership matrix V through iterations in the FCM, calculating the objective function F of the FCM until F no longer changes, and determining an attribution timing feature of the plurality of pieces of historical load data according to a maximum degree-of-membership principle; wherein in a case where $D_i$ belongs to $X_k$, $V_{i,k}$ satisfies:

$$V_{i,k}=\max\{V_{i,1},V_{i,2},\ldots,V_{i,k},\ldots,V_{i,L}\},$$

where max{.} denotes a maximum value function.

14. The storage medium of claim 7, wherein establishing the timing feature model of the distributed generator comprises:

establishing a timing feature model for photovoltaic generation:

$$P_s=ED\eta,$$

where $P_s$ denotes output power of the photovoltaic generation, E denotes a lighting intensity, D denotes an area of a photovoltaic panel and η denotes light energy conversion efficiency; and establishing a timing feature model of a fan:

$$P_w = \begin{cases} 0 & 0 \le V_{ci} \\ (A + Bv + Cv^2)P_r & V_{ci} \le v < V_r \\ P_r & V_r \le v < V_{co} \\ 0 & V_{co} \le v \end{cases},$$

$$A = \frac{V_{ci}(V_{ci} + V_r) - 4V_{ci}V_r\left(\frac{V_{ci} + V_r}{2V_r}\right)^3}{(V_{ci} - V_r)^2},$$

$$B = \frac{-(V_{ci} + V_r) - 4V_{ci}V_r\left(\frac{V_{ci} + V_r}{2V_r}\right)^3}{(V_{ci} - V_r)^2}, \text{ and}$$

$$C = \frac{2 - 4\left(\frac{V_{ci} + V_r}{2V_r}\right)^3}{(V_{ci} - V_r)^2};$$

where $P_w$ denotes output power of the fan, v denotes a wind speed of nature wind, denotes a rated wind speed of the fan, $V_{ci}$ denotes a cut-in wind speed of the fan, $V_{co}$ denotes a cut-out wind speed of the fan, $P_r$ denotes rated output power of the fan, and A, B and C denote fitting coefficients of a nonlinear part of an output of the fan respectively, wherein $V_{ci}$ 4 m/s, and $V_{co}$ is 25 m/s;

acquiring, by using the maximum likelihood estimation and the timing feature model of the distributed generator, the timing feature of the distributed generator which accesses the power distribution region comprises: in a case where the lighting intensity follows a Beta distribution, solving shape parameters λ and μ of the Beta distribution of the lighting intensity by a maximum likelihood method and according to historical data of the lighting intensity measured in the access power distribution region; simulating the lighting intensity satisfying the Beta distribution based on the shape parameters λ and μ of the Beta distribution of the lighting intensity and by a Monte Carlo method, and calculating a timing feature of a photovoltaic unit in the access power distribution region according to the timing feature model for the photovoltaic generation and the simulated lighting intensity; in a case where the wind speed of the nature wind follows a Weibull distribution, solving a shape parameter s and a scale parameter l of the Weibull distribution of the wind speed of the nature wind by the maximum likelihood method and according to historical data of the wind speed of the nature wind measured in the access power distribution region; and simulating the wind speed of the nature wind satisfying the Weibull distribution based on the shape parameter s and the scale parameter l of the Weibull distribution of the wind speed of the nature wind and by the Monte Carlo method, and calculating a timing feature of the fan in the access power distribution region according to the timing feature model of the fan and the simulated wind speed of the nature wind;

establishing the timing feature model of the load comprises: classifying a plurality of pieces of historical load data collected by a load control system by using a fuzzy C-means (FCM) clustering algorithm to obtain a plurality of classes of load data, and extracting a class center of each of the plurality of classes of load data as a timing feature of the each of the plurality of classes of load data;

acquiring, by using the classification and regression tree and the timing feature model of the load, the timing feature of the load which accesses the power distribution region comprises:

constructing a classifier through a classification and regression tree (CART);

wherein constructing the classifier through the CART comprises:

supposing that a current node of the classifier is t, a sample dataset of the current node is S and the sample dataset is composed of M samples, and determining through the timing feature model of the load that the M samples belong to L timing features, wherein L is an integer greater than 0; in a case where a number of samples belonging to a k-th class center $X_k$ in t is $s_k$, expressing a Gini index (GINI) characterizing an impurity degree of the current node t as:

$$GINI(t) = 1 - \sum_{k=1}^{L}(p(X_k | t))^2;$$

where $p(X_k|t)=s_k/M$ denotes a proportion of the samples belonging to $X_k$ in S; and splitting t by using a load characteristic index to generate two subnodes $t_R$ and $t_L$, wherein GINI of the subnodes are GINI($t_R$) and GINI($t_L$) and a reduction amount of the impurity degree in the splitting is: $\Phi(t)=GINI(t)-p_R GINI(t_R)-p_L GINI(t_L)$;

where $p_L GINI(t_L)$ denotes a probability of assigning samples in t to $t_L$, $p_R GINI(t_R)$ denotes a probability of assigning samples in t to $t_R$, and a load characteristic index with a maximum impurity reduction amount is selected as a classification attribute; and repeating the preceding process and continuously selecting the classification attribute until a minimum GINI is satisfied, to obtain a final classifier; and identifying, according to an installation requisition parameter of a new access load and the classifier, a load timing feature of the new access load in the access power distribution region.

15. The storage medium of claim 14, wherein solving the shape parameters $\lambda$ and $\mu$ of the Beta distribution of the lighting intensity by the maximum likelihood method and according to the historical data of the lighting intensity measured in the access power distribution region comprises:

constructing a logarithm likelihood function $L(\lambda,\mu)$:

$$L(\lambda, \mu) = \sum_{i=1}^{n} \ln f(E_i);$$

where $E_i$ denotes a lighting intensity at a moment i; let $$F_1 = \frac{\partial L(\lambda, \mu)}{\partial \lambda} = 0, \text{ and}$$

$$F_2 = \frac{\partial L(\lambda, \mu)}{\partial \mu} = 0;$$

iteratively solving $F_1$ and $F_2$ by a Newton-Raphson method to obtain a correction equation:

$$\begin{bmatrix} F_1(\lambda, \mu) \\ F_2(\lambda, \mu) \end{bmatrix} = \begin{bmatrix} \frac{\partial F_1(\lambda, \mu)}{\partial \lambda} & \frac{\partial F_1(\lambda, \mu)}{\partial \mu} \\ \frac{\partial F_2(\lambda, \mu)}{\partial \lambda} & \frac{\partial F_2(\lambda, \mu)}{\partial \mu} \end{bmatrix} \begin{bmatrix} \Delta\lambda \\ \Delta\mu \end{bmatrix} = 0;$$

selecting an initial value according to the correction equation, and performing iterations until a convergence criterion is satisfied to obtain the shape parameters $\lambda$ and $\mu$ of the Beta distribution; and solving the shape parameter s and the scale parameter l of the Weibull distribution of the wind speed of the nature wind by the maximum likelihood method and according to the historical data of the wind speed of the nature wind measured in the access power distribution region comprises:

$$L(s, l) = \sum_{i=1}^{n} \ln f(v_i)$$

where $v_i$ denotes a wind speed of the nature wind at the moment i; let $$F_3 = \frac{\partial L(s, l)}{\partial s} = 0, \text{ and}$$

$$F_4 = \frac{\partial L(s, l)}{\partial l} = 0;$$

iteratively solving $F_3$ and $F_4$ by the Newton-Raphson method to obtain a correction equation:

$$\begin{bmatrix} F_3(s, l) \\ F_4(s, l) \end{bmatrix} = \begin{bmatrix} \frac{\partial F_3(s, l)}{\partial s} & \frac{\partial F_3(s, l)}{\partial l} \\ \frac{\partial F_4(s, l)}{\partial s} & \frac{\partial F_4(s, l)}{\partial l} \end{bmatrix} \begin{bmatrix} \Delta s \\ \Delta l \end{bmatrix} = 0;$$

selecting an initial value according to the correction equation, and performing iterations until a convergence criterion is satisfied to obtain the shape parameter s and the scale parameter of the Weibull distribution.

16. The storage medium of claim 15, wherein simulating the lighting intensity satisfying the Beta distribution based on the shape parameters λ and μ of the Beta distribution of the lighting intensity and by the Monte Carlo method comprises:

acquiring a probability distribution function F(E) of the lighting intensity E based on the shape parameters λ and μ of the Beta distribution of the lighting intensity, and simulating the lighting intensity satisfying the Beta distribution according to the probability distribution function F(E) of the lighting intensity E and by the Monte Carlo method;

$$f(E) = \frac{\Gamma(\lambda+\mu)}{\Gamma(\lambda)\Gamma(\mu)}\left(\frac{E}{E_m}\right)^{\lambda-1}\left(1-\frac{E}{E_m}\right)^{\mu-1}, \text{ and}$$

$$F(E) = \frac{\Gamma(\lambda+\mu)}{\Gamma(\lambda)\Gamma(\mu)}\int_0^{E/E_m} t^{\lambda-1}(1-t)^{\mu-1}dt;$$

wherein where $\Gamma(.)$ denotes a gamma function, $E_m$ denotes a maximum value of the lighting intensity, and λ and μ denote the shape parameters of the Beta distribution; and simulating the wind speed of the nature wind satisfying the Weibull distribution based on the shape parameter S and the scale parameter l of the Weibull distribution of the wind speed of the nature wind and by the Monte Carlo method comprises:

acquiring a probability distribution function F(v) of the wind speed v of the nature wind based on the shape parameter s and the scale parameter l of the Weibull distribution of the wind speed of the nature wind, and simulating the wind speed of the nature wind satisfying the Weibull distribution according to the probability distribution function F(v) of the wind speed v of the nature wind and by the Monte Carlo method;

wherein the probability distribution function F(v) of the wind speed v of the nature wind is:

$$F(v) = 1 - \exp\left(-\frac{v}{l}\right)^s;$$

where s is the shape parameter of the Weibull distribution, and l is the scale parameter of the Weibull distribution.

17. The storage medium of claim 14, wherein classifying the plurality of pieces of historical load data collected by the load control system by using the fuzzy C-means (FCM) clustering algorithm to obtain the plurality of classes of load data comprises:

for the plurality of pieces of historical load data, classifying the plurality of pieces of historical load data into L classes by using the FCM algorithm, wherein an i-th piece of historical load data is normalized as $D_i$ and expressed as:

$$D_i = [d_{i,1}, d_{i,2}, \ldots, d_{i,j}, \ldots, d_{i,m}],$$

where $d_{i,j}$ denotes active power of the load within a j-th period in the i-th piece of historical load data, m denotes a number of sampling periods in one day, and i is an integer greater than 0;

a class center matrix X is expressed as:

$$X = [X_1, X_2, \ldots, X_k, \ldots, X_L]^T;$$

a degree of membership $V_{i,k}$ of $D_i$ to the k-th class center $X_k$ satisfies a following condition:

$$\sum_{k=1}^{L} V_{i,k} = 1 \; \forall \, i = 1, 2, \ldots, N;$$

where N denotes a number of samples of the historical load data;

an objective function of the FCM is:

$$\min F = \sum_{i=1}^{N}\sum_{k=1}^{L} V_{i,k}^2 \|D_i - X_k\|;$$

solving the above formula through a lagrange transformation to obtain:

$$V_{i,k} = \|D_i - X_k\| \Big/ \sum_{k=1}^{L} \|D_i - X_k\|, \text{ and}$$

$$X_k = \sum_{i=1}^{N}(V_{i,k}^2 D_i) \Big/ \sum_{i=1}^{N} V_{i,k}^2;$$

updating the class center matrix X and a degree-of-membership matrix V through iterations in the FCM, calculating the objective function F of the FCM until F no longer changes, and determining an attribution timing feature of the plurality of pieces of historical load data according to a maximum degree-of-membership principle; wherein in a case where $D_i$ belongs to $X_k$, $V_{i,k}$ satisfies:

$$V_{i,k} = \max\{V_{i,1}, V_{i,2}, \ldots, V_{i,k}, \ldots, V_{i,L}\},$$

where max{.} denotes a maximum value function.

* * * * *